US012494358B2

(12) United States Patent
Vollero et al.

(10) Patent No.: US 12,494,358 B2
(45) Date of Patent: Dec. 9, 2025

(54) ION SOURCE ASSEMBLY WITH MULTIPLE ELLIPTICAL FILAMENTS

(71) Applicant: INFICON, Inc., East Syracuse, NY (US)

(72) Inventors: Michael Vollero, Manlius, NY (US); Mario Weder, Landquart (CH); Jochen Wagner, Syracuse, NY (US)

(73) Assignee: INFICON, INC., East Syracuse, NY (US)

( * ) Notice: Subject to any disclaimer, the term of this patent is extended or adjusted under 35 U.S.C. 154(b) by 5 days.

(21) Appl. No.: 18/039,589

(22) PCT Filed: Dec. 13, 2022

(86) PCT No.: PCT/US2022/052624
§ 371 (c)(1),
(2) Date: May 31, 2023

(87) PCT Pub. No.: WO2023/114166
PCT Pub. Date: Jun. 22, 2023

(65) Prior Publication Data

US 2024/0363325 A1 Oct. 31, 2024

Related U.S. Application Data

(60) Provisional application No. 63/290,436, filed on Dec. 16, 2021.

(51) Int. Cl.
*H01J 49/14* (2006.01)
*H01J 27/20* (2006.01)
*H01J 49/06* (2006.01)

(52) U.S. Cl.
CPC .......... *H01J 49/147* (2013.01); *H01J 27/205* (2013.01); *H01J 49/062* (2013.01)

(58) Field of Classification Search
CPC ....... H01J 49/147; H01J 27/205; H01J 49/062
See application file for complete search history.

(56) References Cited

U.S. PATENT DOCUMENTS 3,989,975 A * 11/1976 Trotel ................. H01J 37/3053 313/153
5,128,617 A * 7/1992 Bills ....................... H01J 41/04 313/363.1

(Continued)

FOREIGN PATENT DOCUMENTS

CN 107068532 A 8/2017
WO 2005045877 A1 5/2005
WO 2010/033427 A1 3/2010

OTHER PUBLICATIONS

PCT/US2022/052624; International Search Report and Written Opinion; Date of Mailing Apr. 4, 2023 (8 pages).

(Continued)

*Primary Examiner* — Wyatt A Stoffa
*Assistant Examiner* — Laura Eloise Tandy
(74) *Attorney, Agent, or Firm* — Barclay Damon LLP

(57) ABSTRACT

An electron bombardment ion source assembly for use in a mass spectrometer and including an anode extending along an axis and surrounding an ionization volume. At least two filaments are each configured to thermionically emit electrons and are positioned outside the ionization volume and proximate to the anode. The at least two filaments each comprise an elliptically-shaped portion and non-elliptical portions on either end of the elliptically-shaped portion. The non-elliptically-shaped portions are configured to be mounted in a fixed position relative to the anode to maintain a constant distance between the elliptically-shaped portion and the anode. The elliptically-shaped portion extends along a plane that intersects a plane perpendicular to the axis of the anode at a non-zero angle.

17 Claims, 10 Drawing Sheets

(56) References Cited

U.S. PATENT DOCUMENTS

| | | | | |
|---|---|---|---|---|
| 5,278,510 | A * | 1/1994 | Baptist | G01L 21/34<br>313/309 |
| 2002/0162508 | A1 * | 11/2002 | Dykstra | H01J 27/026<br>118/723 VE |
| 2009/0146665 | A1 * | 6/2009 | Knott | H01J 41/04<br>324/460 |
| 2009/0147776 | A1 | 6/2009 | Knott | |
| 2016/0027630 | A1 * | 1/2016 | Splendore | H01J 27/205<br>250/427 |

OTHER PUBLICATIONS

European Patent Office; Extended European Search Report; European Application No. 22908297.9; Dated: Apr. 25, 2025; 7 pages.

* cited by examiner

ION SOURCE ASSEMBLY WITH MULTIPLE ELLIPTICAL FILAMENTS

CROSS-REFERENCE TO RELATED APPLICATION

This is application is a national stage application pursuant to 35 U.S.C. § 371 of International Application No. PCT/US2022/052624, filed on Dec. 13, 2022, which claims priority to, and the benefit of, U.S. Provisional Patent Application No. 63/290,436, filed on Dec. 16, 2021. The entire contents of said applications are hereby incorporated by reference.

FIELD OF TECHNOLOGY

This disclosure is directed to an ion source assembly with multiple filaments where each filament has an elliptically-shaped central length.

BACKGROUND

Mass spectrometry is a common analytical technique used to measure the mass-to-charge ratio of ions in a sample in order to determine the chemical composition of the sample. Generally, mass spectrometry requires ionization of the sample, separating the ions according to their mass-to-charge ratio, detecting the separated ions, and displaying the results as spectra showing signal intensity of the detected ions as a function of the mass-to-charge ratio.

Ionizing a sample, specifically a gaseous sample, may be done using an electron bombardment ionization source, a.k.a. an electron ionization (EI) ion source. The EI ion source includes a source of electrons, which may be a filament that is heated to a temperature at which it emits electrons. The filament that is used may be a fine wire comprised of refractory metal that is either uncoated or coated with a metal oxide. The heating of the filament may be done resistively by passing an electric current through the filament. The thermionically emitted electrons from the filament are accelerated through a wall or anode and into an ionization volume. The movement of the electrons is guided by electric fields resulting from potential differences maintained between the filament and the anode and perhaps other electrodes by means of a control unit, as well as the geometry and locational relationships between the parts. The anode defines at least one opening that enables some percentage of the electrons to pass through the anode and into the ionization volume. It is generally desirable to maintain the filament temperature and various electric potentials so that a constant electron emission current passes into the ionization volume. Additional electrodes, such an electron repeller, may be included for steering the electrons. Inside the ionization volume, at least some of the accelerated or energetic electrons will collide with molecules of the gas sample that is in the ionization volume. The electrons have sufficient energy such that, upon colliding with the gas molecules, they will ionize and/or fragment the gas molecules to produce ions.

These ions are then accelerated and steered by means of other potentials established using ion optical elements (that are part of the ion source) into the mass filter. Some ion sources also include an ion repeller positioned upstream of the ionization volume. The ion repeller may be set to a specific electric potential in order to aid in controlling trajectories of the ions generated in the ionization volume. The ion repeller may be a flat or planar electrode or it may be concave in a direction towards the mass filter. When the ions having various mass-to-charge ratios reach the mass filter they are separated either spatially or temporally. The ions are then detected by an ion detector and a mass spectrum is determined from the output of the ion detector.

The filament of the EI ion source has a finite lifetime of use. In order to emit sufficient numbers of electrons, the filament must run at temperatures between 1500-2400 K. At these high temperatures the filament wire (and the coating if present) eventually evaporates resulting in filament failure. Filament failure may also occur as a result from changes in the crystal structure of the filament wire that take place at the high operating temperatures. Additionally, the electron-emitting surface of the filament may be chemically altered by the gases in the system, which increases the work function of the electron-emitting surface while decreasing the electron emission efficiency of the electron-emitting surface. When no electrons or insufficient electrons are available to ionize the gas sample due to a broken, misshapen, or chemically "poisoned" filament, the mass spectrometer no longer functions satisfactorily. Consequently, a process that is being monitored and/or controlled based on data produced by the mass spectrometer would have to be stopped or else "run blind" until there is an opportunity to replace the filament. Replacement of the filament is a time consuming and inconvenient process since the filament is often located inside of a process vacuum chamber such that the process vacuum chamber must be vented to perform this replacement. Therefore, it is desirable to reduce the frequency of filament replacement and more preferable to be able to schedule when a pre-emptive filament replacement occurs so the filament may be replaced at the same time that the process chamber is off-line for other maintenance activities.

One commonly employed method of addressing this disadvantage of EI ion sources is to include a second filament in the ion source that is positioned near the anode and may be brought into operation when the first filament fails. The two filaments are usually copies of each other and are mirrored about a plane that extends along the ion-optical axis of the ion source. Positioning the filaments in this manner is done in an effort to maintain consistent performance of the mass spectrometer by enabling ions to be formed in the same regions of the ionization volume regardless of which filament is in use. This ensures that the ions are generated in a location where the electric fields are able to steer the ions so they are injected successfully into the mass filter and where the electric fields are high enough to overcome space-charge effects on sensitivity. However, one drawback of this type of EI ion source is that the space available near the anode is generally limited so each of the two filaments is shorter than that filament used when there is only a single filament. The relation of electron emission current density leaving an electron-emission surface to that surface's temperature and work function is described by the Richardson equation as a monotonically increasing function of temperature. Since the total electron emission current depends on the area of the emitting surface, a shorter filament must be operated at a higher temperature in order to obtain the same total emission current. Therefore, two shorter filaments operated sequentially do not last twice as long as one long filament. In fact, the combined operating life of the two short filaments may not even be as long as the operating life of the single filament at the "normal" length. Moreover, a shorter filament necessarily loses more heat to its mounting arrangement than a longer filament. This loss of heat is due to the lower thermal resistance offered by the shorter path along the wire from the central region of the filament to the mounting points than compared to the longer, single filament. As a result, even higher temperatures are required at the hottest parts (near the center) of the filament in order to keep total electron emission at the required levels, which reduces the operating life of the filament.

Two key properties of an ion source are sensitivity (number of ions created and injected into the mass filter with acceptable velocities per unit pressure) and linearity (degree to which the sensitivity is independent of pressure). These properties cannot be disregarded entirely in an attempt to extend filament lifetime. For example, the emission current and/or the operating pressure may be decreased in an effort to decrease the filament temperature and thus extend the filament life. However, the reduction in emission current or operating pressure is done at the expense of sensitivity and/or ion current.

These are just some of the disadvantages associated with ion sources currently used in mass spectrometers.

SUMMARY

An embodiment of an ion source assembly for use in a mass spectrometer includes a cylindrical anode structure which at least partially defines an ionization volume. At least two filaments are located proximate to the anode and serve as sources of electrons for use in ionizing a sample under analysis by means of electron bombardment. The filaments are approximately elliptical in shape in their central portions with straight end sections tangential to the elliptical portions. Two embodiments are described herein, however the inventive ion source assembly is not limited to the two embodiments described. In one embodiment, the filaments can be mounted so as to be parallel to each other, or alternatively, they can be mounted as copies of each other rotated 180° about the central axis of the anode structure. The filaments are mounted to supporting members at positions on the straight end sections and located such that the central elliptical portions are at a fixed distance from the cylindrical anode structure. The filaments are also mounted so as to locate one end of the semi-major axis of the roughly elliptical portions of each of the filaments at similar positions in the direction of the axis of the anode cylinder.

An embodiment of an electron bombardment ion source assembly for use in a mass spectrometer includes a cylindrical anode extending along an axis and surrounding an ionization volume and first filament and second filaments that each thermionically emit electrons. The first and second filaments are positioned outside the ionization volume and proximate to the cylindrical anode. The first and second filaments each comprise an elliptically-shaped central length and non-elliptical lengths on either end of the elliptically-shaped central length. The non-elliptical lengths are structured to be mounted in a fixed position relative to the cylindrical anode to maintain a constant distance between the elliptically-shaped central length and the cylindrical anode. Each elliptically-shaped central length extends along a plane that intersects a plane perpendicular to the axis of the cylindrical anode at a non-zero angle.

Another embodiment of an electron bombardment ion source assembly for use in a mass spectrometer includes an anode extending along an axis and surrounding an ionization volume and at least two filaments that are each thermionically emit electrons. The at least two filaments are positioned outside the ionization volume and proximate to the anode. The at least two filaments each include an elliptically-shaped portion and non-elliptical portions on either end of the elliptically-shaped portion. The non-elliptical portions are structured to be mounted in a fixed position relative to the anode to maintain a constant distance between the elliptically-shaped portion and the anode. Each elliptically-shaped portion extends along a plane that intersects a plane perpendicular to the axis of the anode at a non-zero angle.

In an embodiment, each elliptically-shaped portion includes an apex and the at least two filaments are each positioned such that each apex is at a same depth relative to the anode. In an embodiment, each non-zero angle is caused by a rotation of the at least two filaments about an axis of rotation extending through the apex of each of the at least two filaments. In an embodiment, the at least two filaments extend along parallel planes. In an embodiment, the axis of rotation intersects the axis of the anode at an angle of 90°. In another embodiment, the at least two filaments are images of each other rotated through some angle about the axis of the anode. In a further embodiment, at least one of the at least two filaments is coated with a metal oxide.

BRIEF DESCRIPTION OF DRAWINGS

A more particular description of the invention briefly summarized above may be had by reference to the embodiments, some of which are illustrated in the accompanying drawings. It is to be noted, however, that the appended drawings illustrate only typical embodiments of this invention and are therefore not to be considered limiting of its scope, for the invention may admit to other equally effective embodiments. Thus, for further understanding of the nature and objects of the invention, references can be made to the following detailed description, read in connection with the drawings in which.

DETAILED DESCRIPTION

The following discussion relates to various embodiments of an ion source assembly with multiple elliptical filaments. It will be understood that the herein described versions are examples that embody certain inventive concepts as detailed herein. To that end, other variations and modifications will be readily apparent to those of sufficient skill. In addition, certain terms are used throughout this discussion in order to provide a suitable frame of reference with regard to the accompanying drawings. These terms such as "upper", "lower", "outward", "inward", "top", "bottom", "first", "second", and the like are not intended to limit these concepts, except where so specifically indicated. The terms "about" or "approximately" as used herein may refer to a range of 80%-125% of the claimed or disclosed value. With regard to the drawings, their purpose is to depict salient features of the ion source assembly with multiple elliptical filaments and are not specifically provided to scale.

Figure 1:
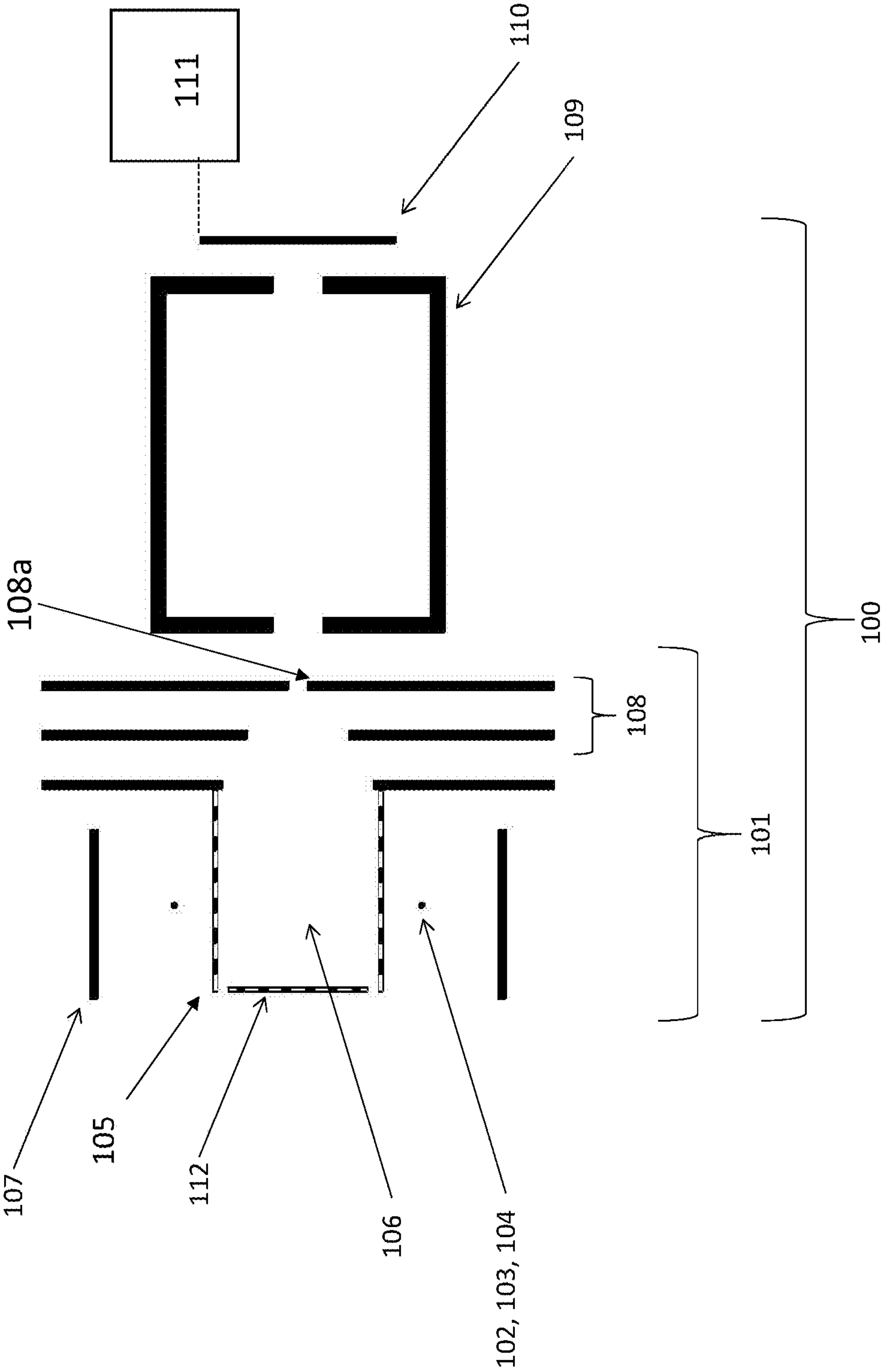
FIG. 1 PRIOR ART
FIG. 1 schematically illustrates a cross-sectional view of an embodiment of a prior art ion source assembly for use in a mass spectrometer.
Figure 2:
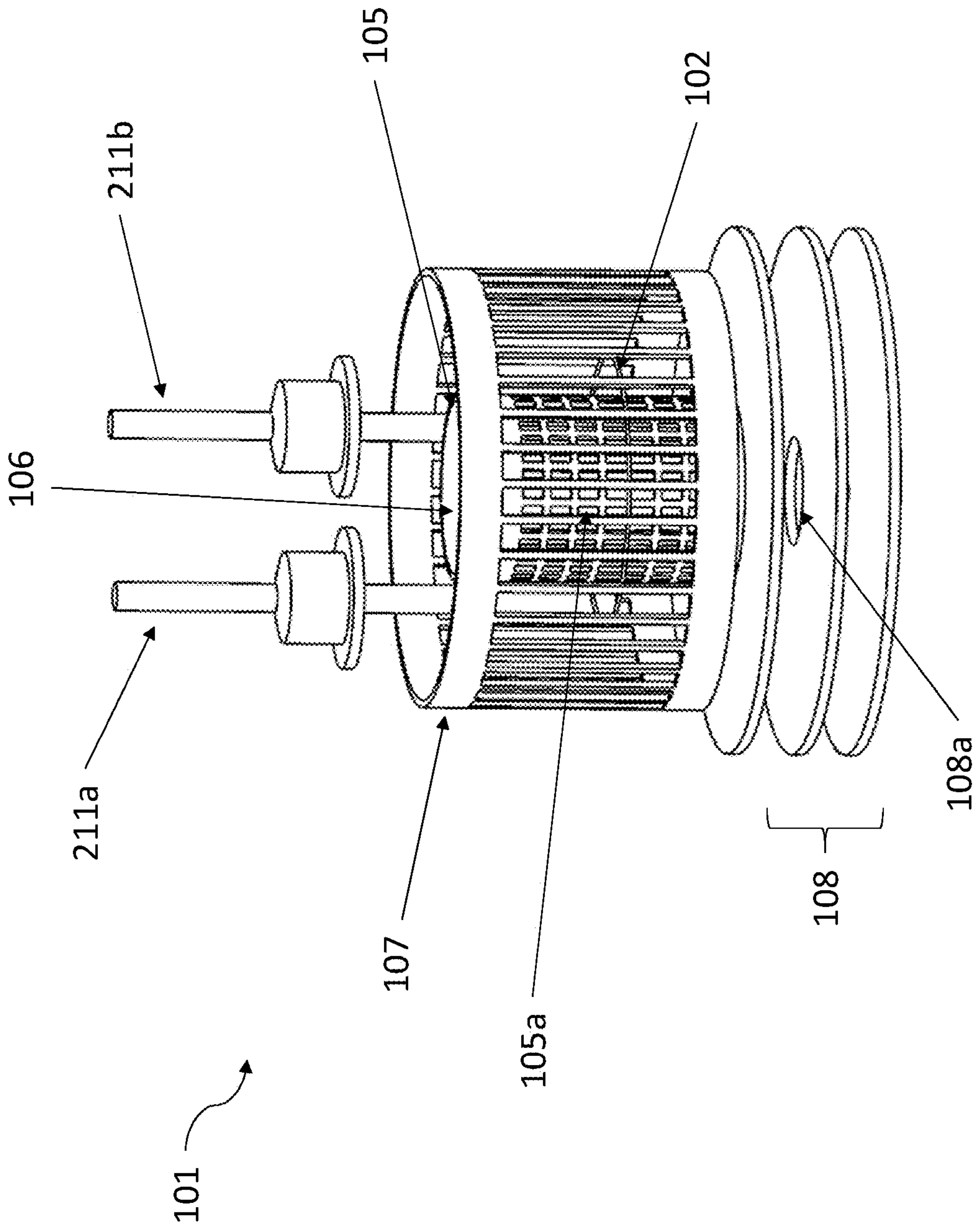
FIG. 2 PRIOR ART
FIG. 2 illustrates a perspective view of an embodiment of a prior art ion source assembly for use in a mass spectrometer.

Referring to FIGS. 1 and 2, a portion of a mass spectrometer 100 is shown that includes an electron ionization (EI) ion source assembly 101. The EI ion source assembly (ion source assembly) 101 includes a source of electrons 102, an anode 105 at least partially surrounding or defining an ionization volume 106, one or more electron repellers 107, and one or more ion repellers 112. As shown, the source of electrons is a filament 102, such as a thin wire, that is heated to a temperature (1500-2400 K) at which the filament 102 thermionically emits electrons. The filament 102 may be comprised of a refractory metal wire 103 that may be coated with a metal oxide 104. The filament 102 may be connected to a source of electrical current to enable the electrical current to pass through the filament 102 in order to heat the filament 102 to a temperature at which electrons are emitted from the filament 102. As shown, the anode 105 is spaced apart from the filament 102 and is generally positioned between the filament 102 and the ionization volume 106. As shown, the anode 105 may at least partially surround the ionization volume 106. Additional electrodes, such as one or more electron repellers 107 may be included and used to steer the electrons emitted from the filament 102. As shown, the electron repeller 107 is positioned radially outward from the filament 102 such that the filament 102 is positioned between the electron repeller 107 and the anode 105. The thermionically emitted electrons from the filament 102 may be steered by the electron repeller 107 and accelerated through an electrical potential difference that is established between the filament 102 and the anode 105 of the ionization volume 106. The electric potentials that exist on components of the ion source assembly 101 are established and maintained by a control unit (not shown) or control electronics (not shown). These potentials may also be adjusted via the control unit (not shown). The trajectories of the electrons further depend on the geometries of the anode and filaments and their relative locations. The electrons emitted from the filament 102 pass through openings 105*a* defined on the anode 105 and into the ionization volume 106 where at least some of the electrons will collide with molecules of the gas sample that are present in the ionization volume 106. The electrons have sufficient energy such that, upon colliding with the gas molecules, they will ionize and/or fragment the gas molecules to produce ions.

As shown in FIGS. 1 and 2, the prior art ion source assembly 101 further includes one or more optical elements 108 that define an ion exit, which could be an aperture 108*a* as is shown or a grid. The one or more optical elements 108 establish electric potentials which act to accelerate and steer the ions produced in the ionization volume 106 into the mass filter 109. The mass filter 109 separates the ions of various mass-to-charge ratios either spatially or temporally. The ions are then detected by an ion detector 110 and the mass spectrum is determined from the output of the ion detector 110. The ion detector 110 may be in electrical communication with an interface 111 on which the output of the ion detector 110 and/or the mass spectrum are displayed and/or recorded. In some embodiments of the ion source assembly 101, an ion repeller 112 is positioned upstream of the ionization volume 106 and is set to a specific electric potential in order to aid in controlling trajectories of the ions produced.

Referring to FIG. 2 the filament 102 is a single filament that extends a length from a first end to a second end. The first end of the filament 102 is connected to and supported by a first support member 211*a* and the second end of the filament 102 is connected to and supported by a second support member 211*b*.

Figure 3A:
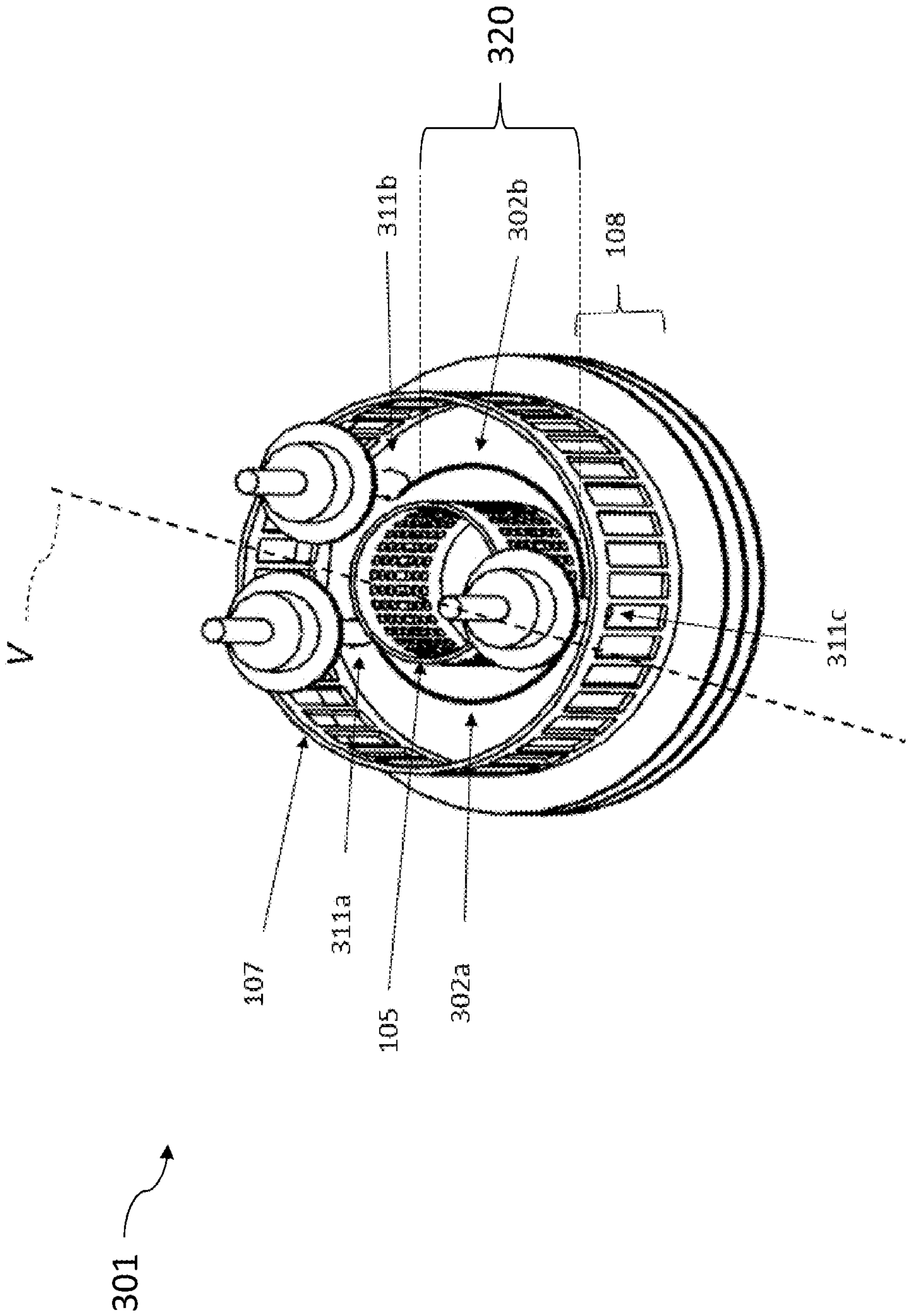
FIG. 3A PRIOR ART
FIG. 3A illustrates a top perspective view of an embodiment of a prior art dual filament ion source assembly for use in a mass spectrometer.
Figure 3B:
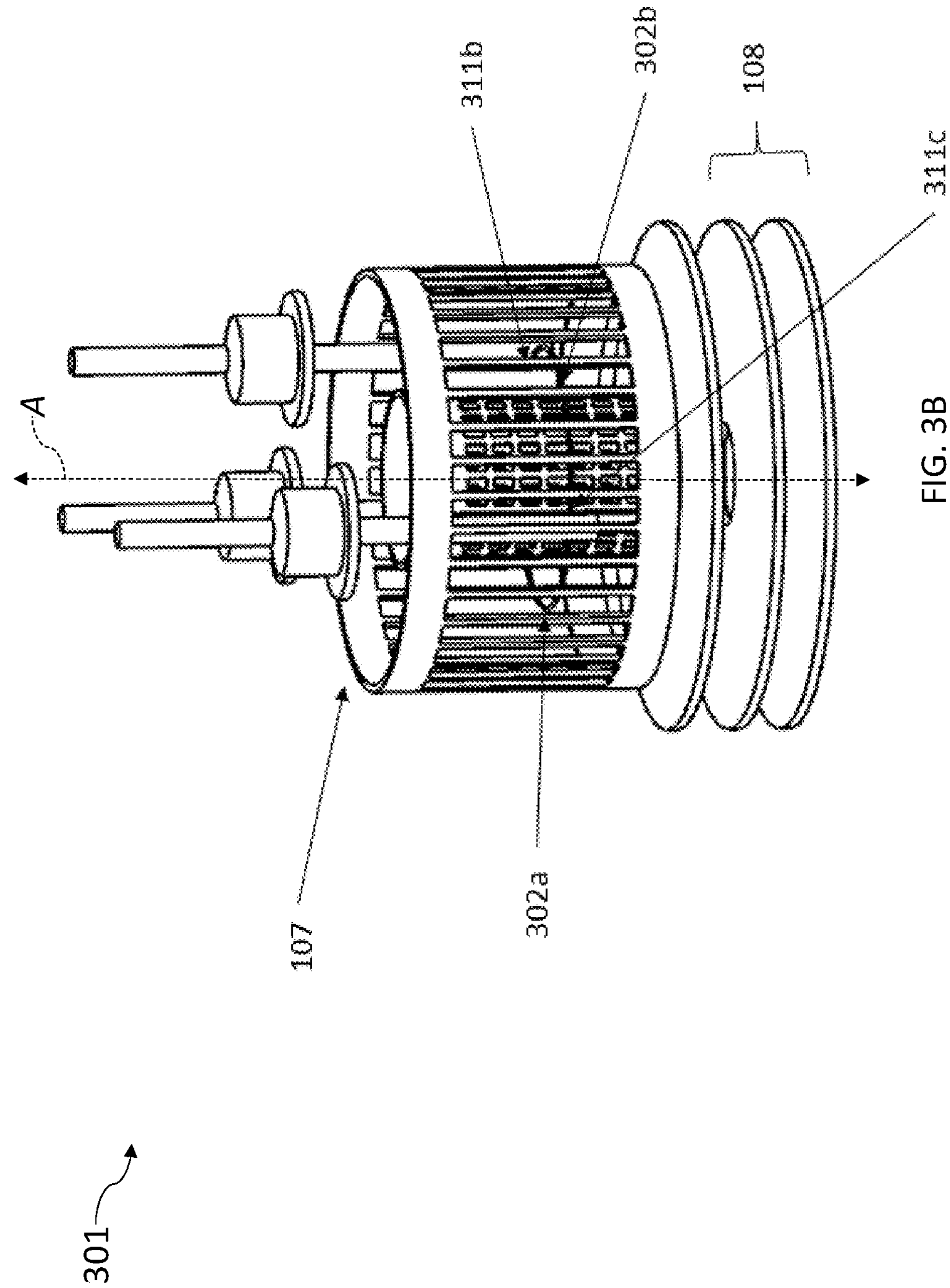
FIG. 3B PRIOR ART
FIG. 3B illustrates a side perspective view of an embodiment of a prior art dual filament ion source for use in a mass spectrometer.
Figure 4:
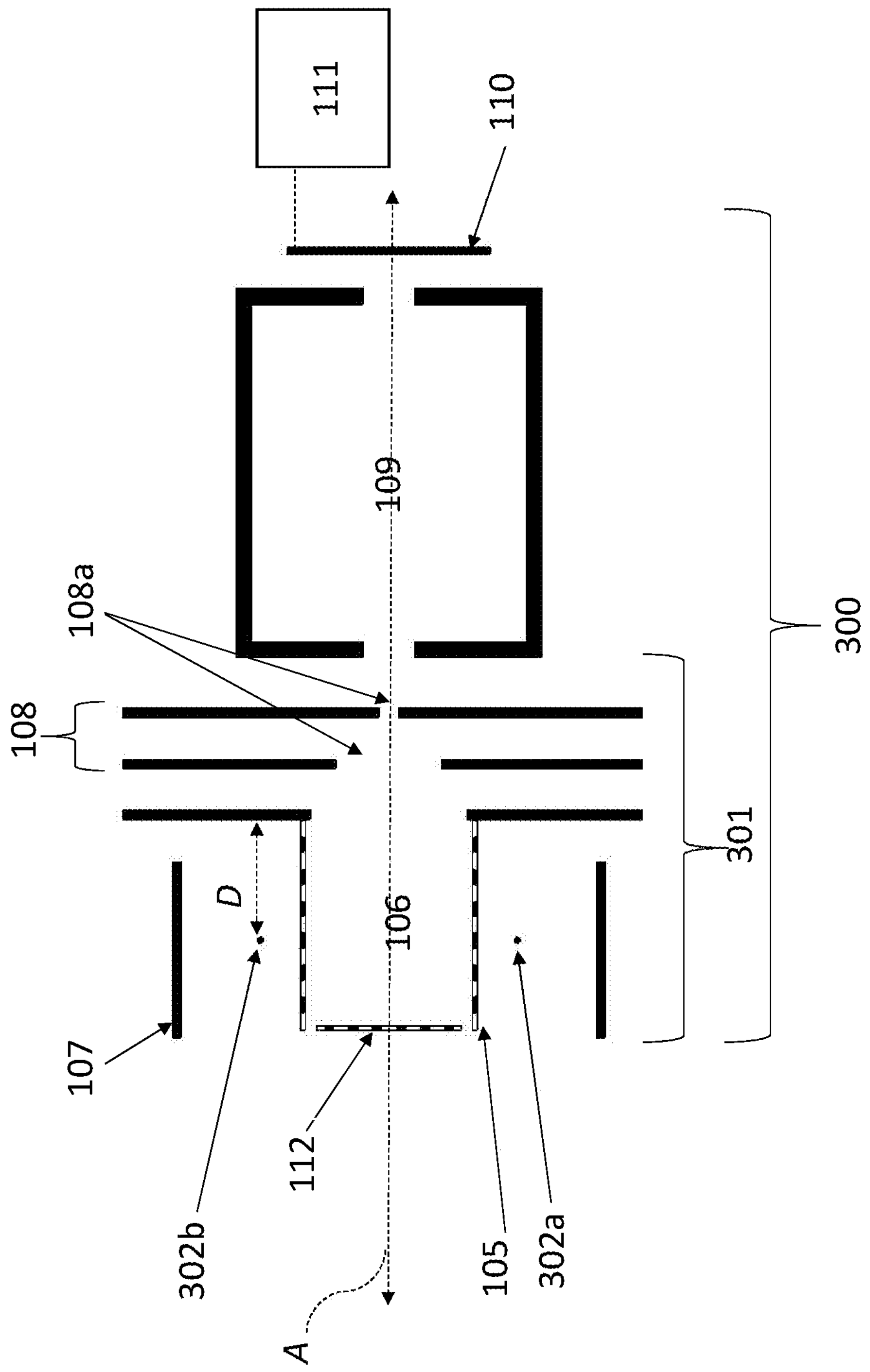
FIG. 4 PRIOR ART
FIG. 4 schematically illustrates a cross-sectional view of the embodiment of FIG. 3B.
Figure 5:
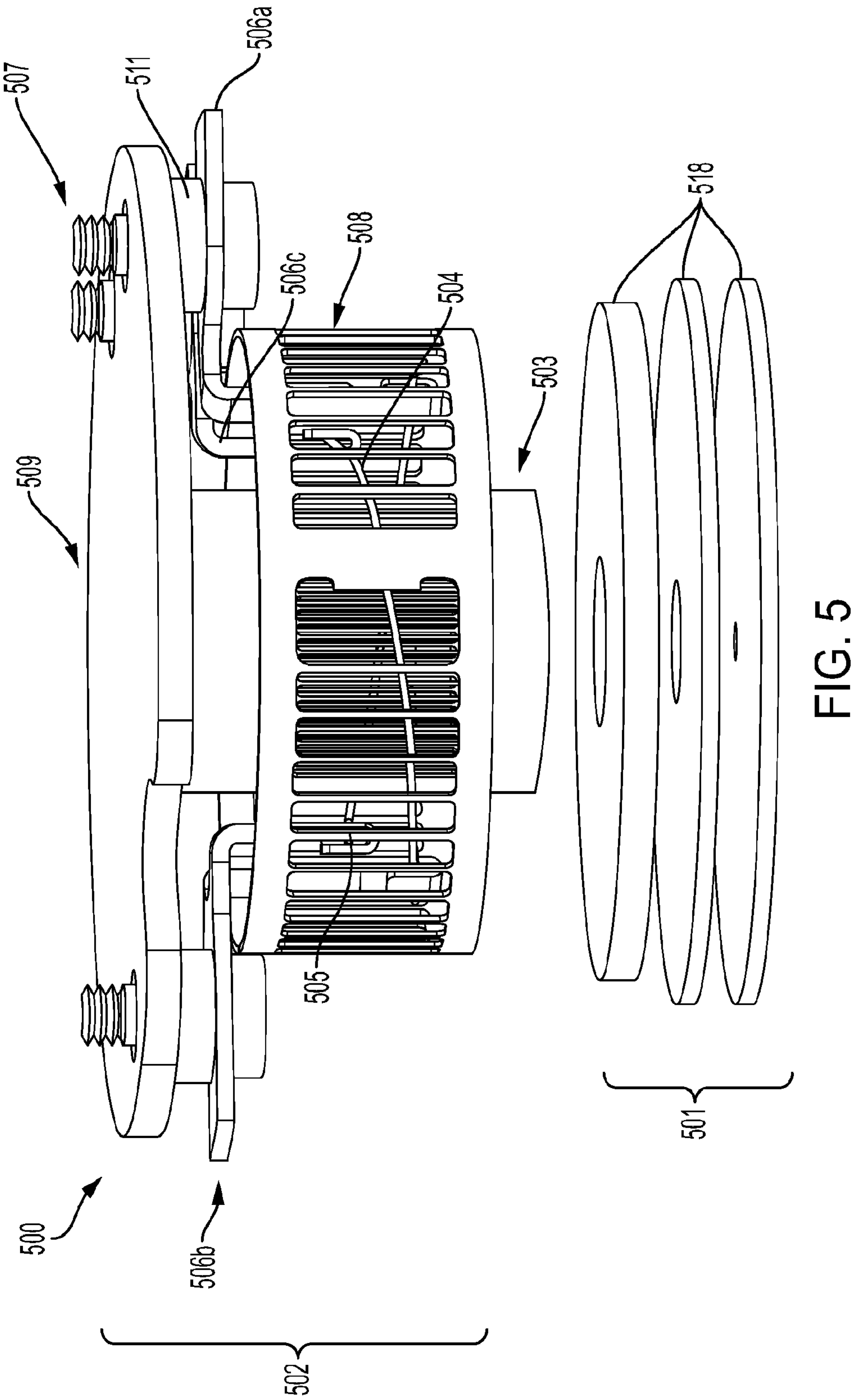
FIG. 5 illustrates a side perspective view of an embodiment of an ion source assembly according to the present disclosure for use in a mass spectrometer.

FIGS. 3A-4 illustrate an embodiment of a prior art dual filament ion source assembly 301. As can be seen, two shorter filaments 302*a*, 302*b* have replaced the single, long filament 102 from the embodiment of FIG. 1. The first filament 302*a* extends a length from a first end that is connected to and supported by a first support member 311*a*, to a second end. The second filament 302*b* extends a length from a first end that is connected to and supported by a second support member 311*b*, to a second end. The second ends of both the first and second filaments 302*a*, 302*b* are connected to and supported by a third or common support member 311*c*. Together, the length of the first filament 302*a* and the length of the second filament 302*b* may approximate the length of the single filament 102 of the embodiment of FIGS. 1 and 2. The first and second filaments 302*a*, 302*b* are positioned relative to vertical plane V, which extends along or parallel to the optical axis 4 of the ion source assembly 301, such that they are mirror images of each other. While this dual-filament ion source does have some advantage over the single filament version in that the user can continue operating the instrument after failure of the first filament and knows to schedule maintenance, it does not have an extended overall lifetime for reasons described above. The two filaments, being approximately half the length of the single filament, each survive operation for significantly less than half the time that the single filament docs.

As shown in the prior art ion sources, the filaments are circular or together form a circular shape and are concentric with the cylindrical anode in order to produce a radial electric field between the filament and anode which is of constant magnitude along the filaments' middle lengths. In addition, the middle lengths of the filaments 102, 302*a*, 302*b* are located at a particularly chosen depth (D in FIG. 4) into the anode 105 or a position along the optical axis A of the ions source assembly 301 relative to the anode 105. The vast majority of the electrons emitted by the filaments 102, 302*a*, 302*b* are emitted from the middle lengths of the filaments, as this is where the highest filament temperatures exist. Locating the electron sources such that the middle lengths of the filaments are at or close to the chosen depth provides electron trajectories that ensure that the ions are created in the most advantageous locations within the ionization volume 106 with regard to the ion source assembly performance.

These prior art embodiments of ions source assemblies 101, 301 have been provided to explain general concepts and operations of ion source assemblies. The inventive ion source assembly 500 (ion source assembly) will now be described with reference to FIGS. 5-9D. Some of the components of the ion source assembly 500 are similar or identical to components of the prior art ion source assemblies 101, 301 previously described and will not be explained in great detail, or at all. The embodiments of the ion source assembly 500 described below are not limiting as other embodiments are envisioned and encompassed by this disclosure. For example, the described embodiments of the ion source assembly 500 include two electron sources, however other embodiments may include more than two electron sources.

Referring to FIGS. 5-7D, the ion source assembly 500 comprises an upper section 502 and a lower section 501. The lower section 501 includes ion optical elements 518 that, when placed downstream the upper section 502, aid in extraction of ions from upper section 502 and injection of these ions into the mass filter (not shown), similar to ion sources of the prior art. The upper section 502 includes an ionization volume 510 (FIGS. 7A, 9A) enclosed in a cylindrical anode 503, around which are arranged a first filament 504 and a second filament 505. The first and second filaments 504, 505 are supported in place relative to the anode 503 and provided with electrical connections by mounting or support elements 506*a*-*c*, and screws 507, and insulators 511. The anode 503 must be at least partially transparent to electrons leaving the first and second filaments 504, 505. As shown in the figures, the anode 503 comprises a cage structure defining a plurality of openings 503*a* (FIG. 6B) which enable electrons emitted by the first and second filaments 504, 505 to pass into the ionization volume 510. Surrounding the anode 503 and filaments 504, 505 is an electron repeller 508 that is approximately concentric to the anode 503 and the first and second filaments 504, 505. The various components comprising the upper section 502 of the ion source assembly 500 are all held in relative position by their common mounting to an upper plate 509.

Figure 6B:
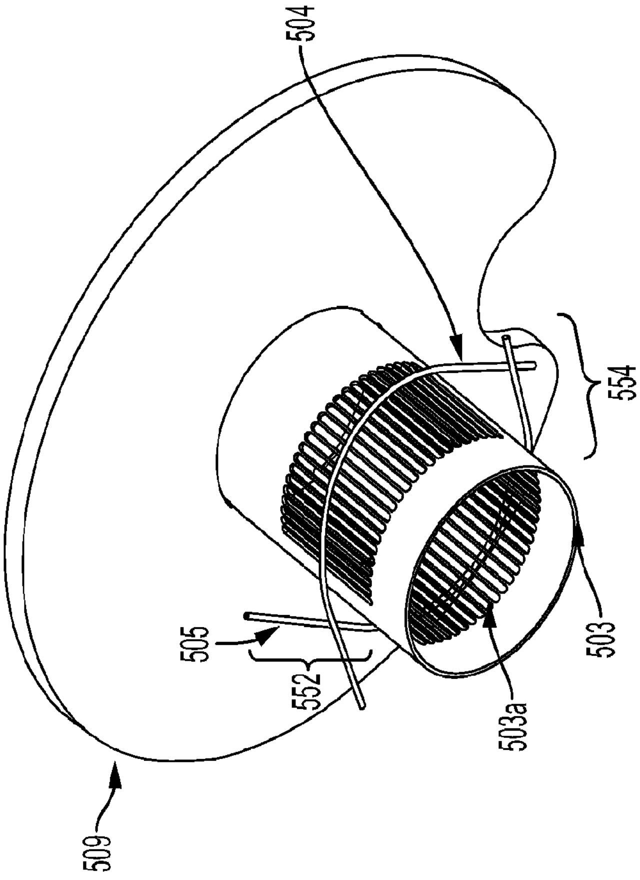
FIG. 6B illustrates a perspective side view the embodiment of FIG. 6A.
Figure 6C:
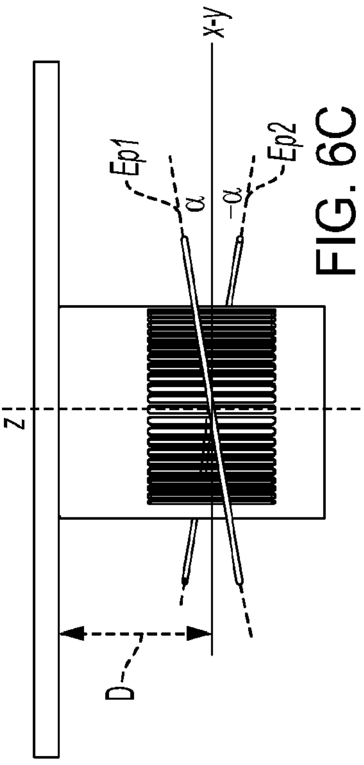
FIG. 6C illustrates an elevational view of the embodiments of FIGS. 6A-B.
Figure 6A:
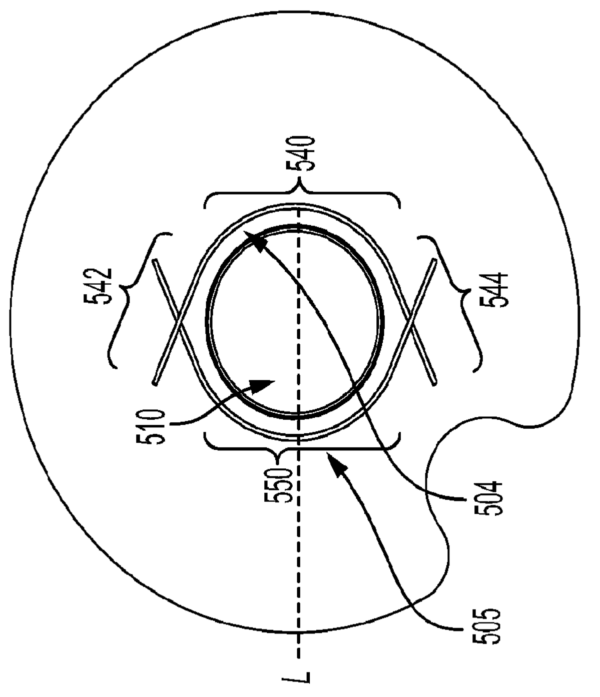
FIG. 6A illustrates a bottom plan view of an embodiment of multiple filaments positioned around an anode of an embodiment of the ion source assembly according to the present disclosure.
Figure 6D:
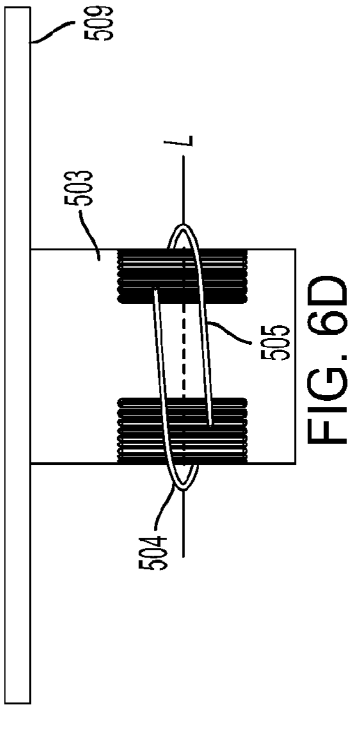
FIG. 6D illustrates an elevational view of the embodiments of FIGS. 6A-C specifically showing an exemplary orientation of the ends of the multiple filaments in relation to each other.
Figure 7A:
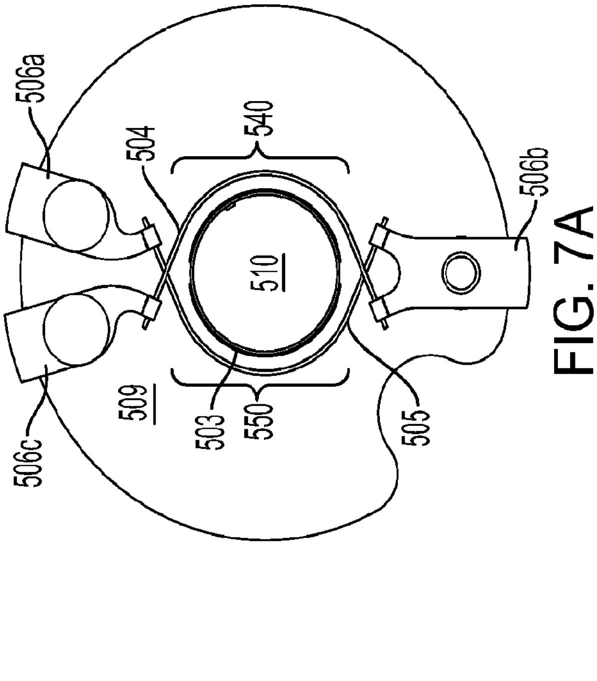
FIG. 7A illustrates the embodiment of FIG. 6A further including an embodiment of mounting elements that retain and mount the filaments in place relative to the anode.
Figure 7B:
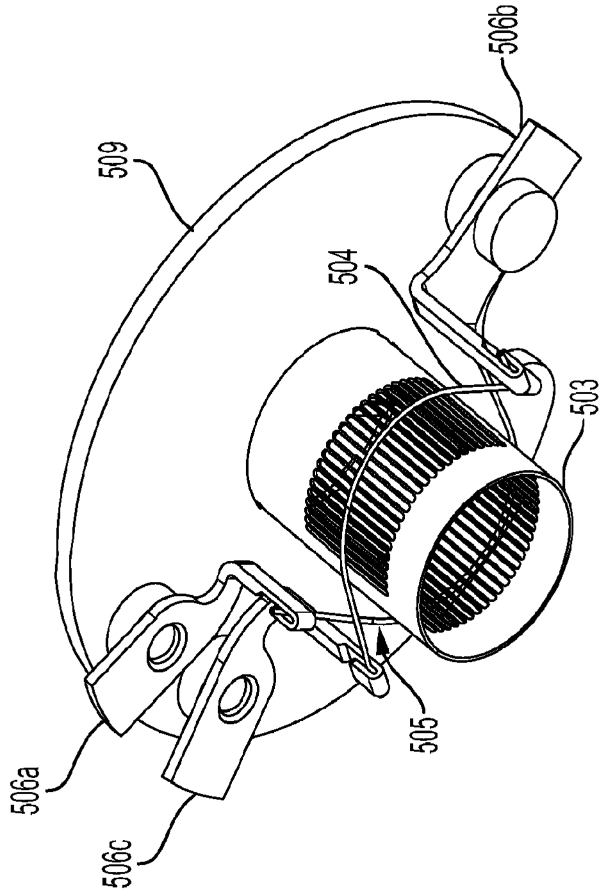
FIG. 7B illustrates the embodiment of FIG. 6B including the embodiment of the mounting elements of FIG. 7A.
Figure 7C:
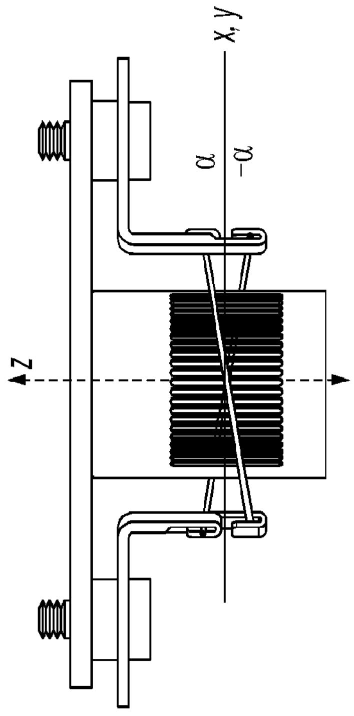
FIG. 7C illustrates the embodiment of FIG. 6C including the embodiment of the mounting elements of FIGS. 7A-B.
Figure 7D:
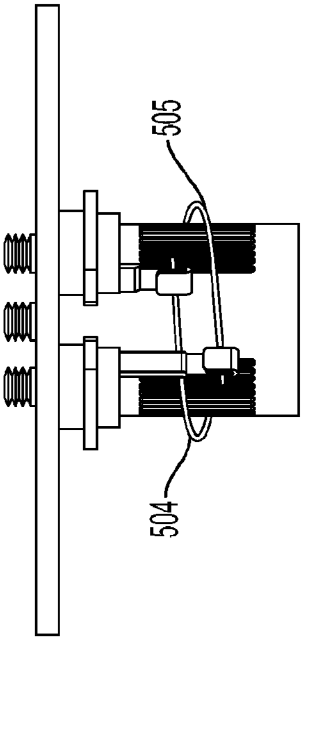
FIG. 7D illustrates the embodiment of FIG. 6D including the embodiment of the mounting elements of FIGS. 7A-C.
Figure 8A:
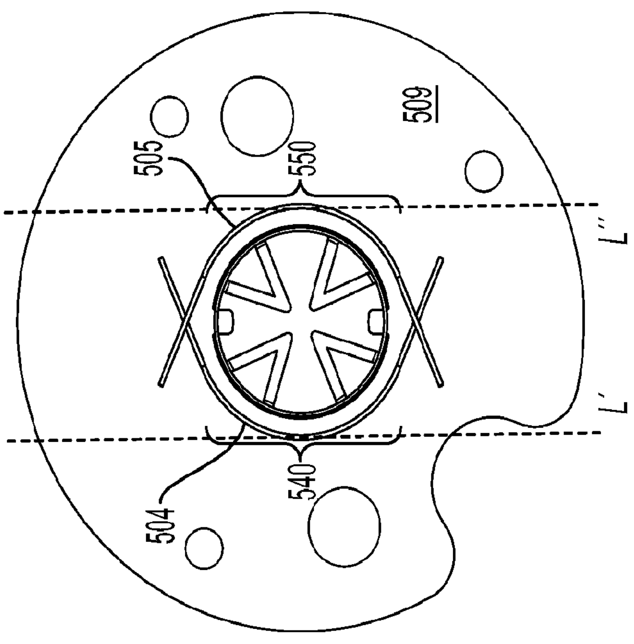
FIG. 8A illustrates a bottom plan view of another embodiment of the multiple filaments positioned around an anode of an embodiment of the ion source assembly according to the present disclosure.
Figure 8B:
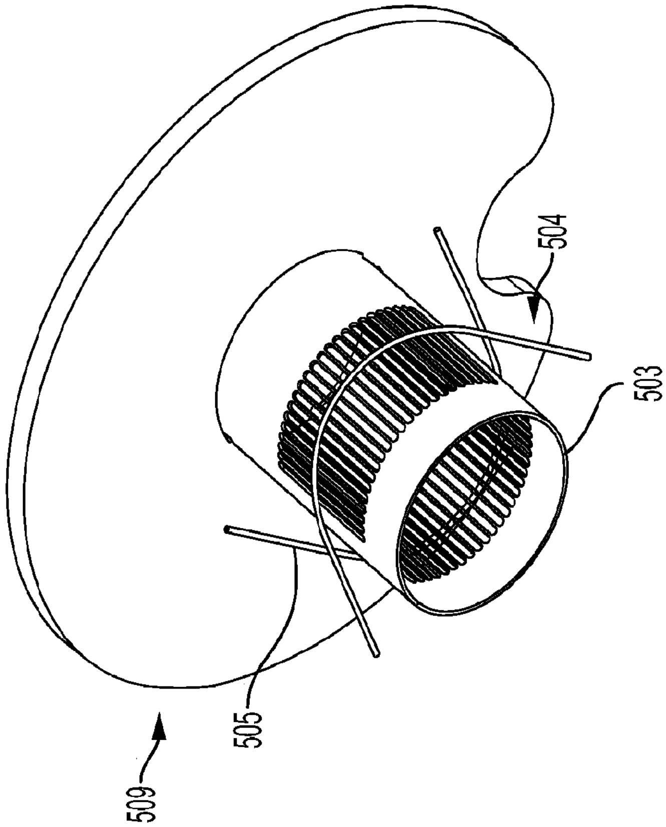
FIG. 8B illustrates a perspective side view the embodiment of FIG. 8A.
Figure 8C:
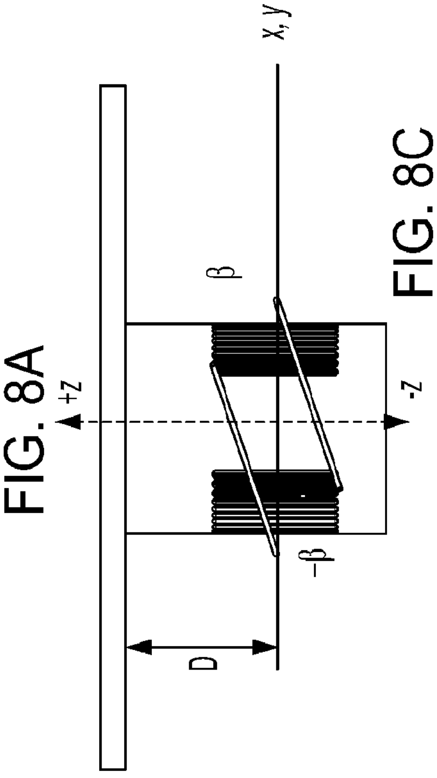
FIG. 8C illustrates a front plan view of the embodiments of FIGS. 8A-B.
Figure 8D:
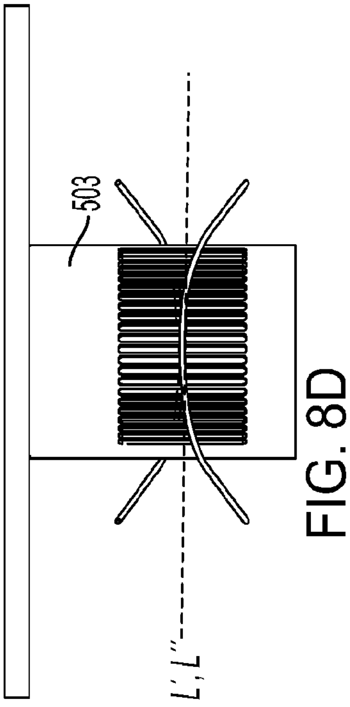
FIG. 8D illustrates a side plan view of the embodiments of FIGS. 8A-C specifically showing another exemplary orientation of the ends of the multiple filaments in relation to each other.
Figure 9B:
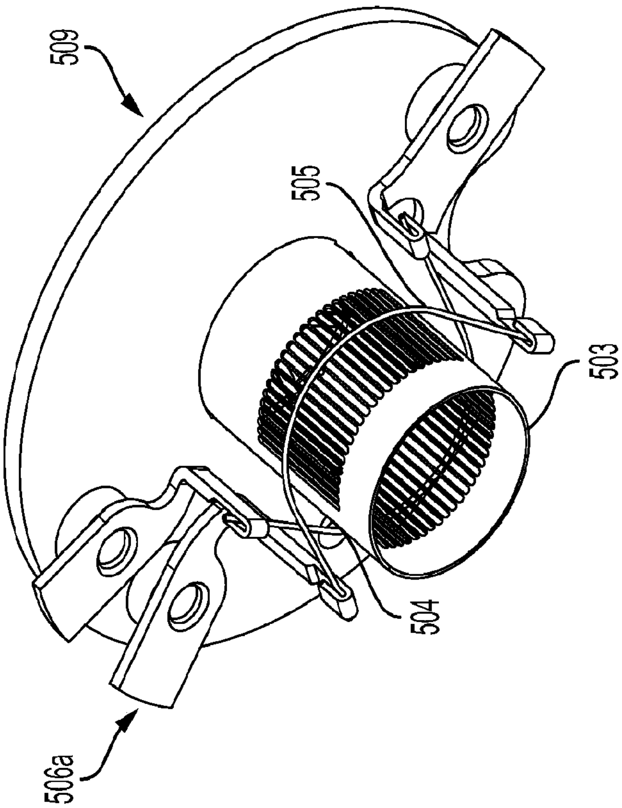
FIG. 9B illustrates the embodiment of FIG. 8B including the embodiment of the mounting elements of FIG. 9A.
Figure 9D:
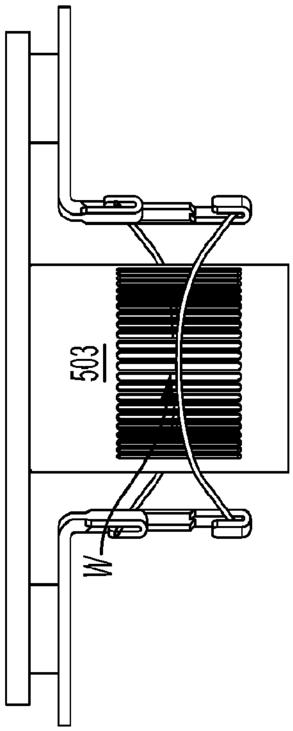
FIG. 9D illustrates the embodiment of FIG. 8D including the embodiment of the mounting elements of FIGS. 9A-C.
Figure 9A:
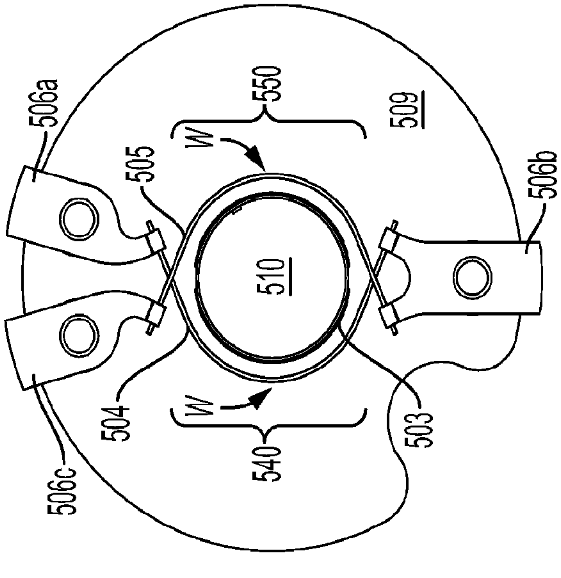
FIG. 9A illustrates the embodiment of FIG. 8A further including another embodiment of the mounting elements that retain and mount the filaments in place relative to the anode.
Figure 9C:
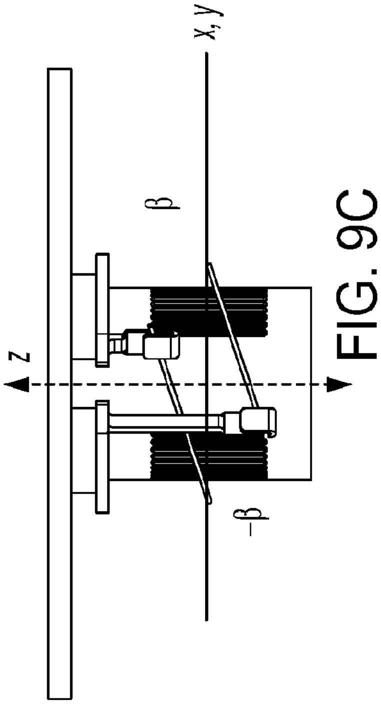
FIG. 9C illustrates the embodiment of FIG. 8C including the embodiment of the mounting elements of FIGS. 9A-B.

As shown specifically in FIG. 6A, the first and second filaments 504, 505 each comprise central elliptical sections or middle sections or emitting lengths 540, 550 and approximately straight end sections 542, 544, 552, 554 on either side of the middle section 540, 550 and that extend along a filament axis. The first and second filaments 504, 505 are positioned relative to the anode 503 such that their middle sections 540, 550 form an approximately elliptical shape with the end sections 542, 544, 552, 554 of each filament 504, 505 extending tangentially from the middle section 540, 550. The combined elliptical configuration of the first and second filaments 504, 505 enables them to be installed so that the planes of the first and second filaments 504, 505 make an angle relative to the anode axis z (or optical axis 4 in FIG. 1) and still maintain a constant distance between each filament 504, 505 and the anode 503 over the middle section 540, 550 of each filament 504, 505. The middle section 540, 550 of each filament 504, 505 is where the vast majority of the electrons are emitted since in operation it is hotter than other parts of the filament. Furthermore, by installing the filaments 504, 505 at well-chosen angles, choosing the elliptical shape to match the angle, and including straight, tangential sections by means of which the filaments are mounted to supporting posts or other means, the filaments 504, 505 themselves can be substantially longer than in the prior art dual filament design, and even having emitting central sections 540, 550 as long as the original single filament design. By positioning the filaments 504, 505 at an angle relative to the anode axis z enables the middle section 540, 550 of each filament 504, 505 to be positioned at the same depth D (FIG. 6C) so as to provide consistent performance between the multiple filaments 504, 505.

The angle α relative to the x-y plane perpendicular to anode axis z at which the planes Ep1, Ep2 of the first and second filaments 504, 505, respectively are installed is ideally kept as small as possible while still leaving sufficient clearance for mounting the filaments and avoiding electrical shorts between the filaments (except for the desired connection at their shared common connection). The filaments are also installed so as to place middle portion 540, 550 of each filament 504, 505, at the correct depth D (FIG. 6C) or position along the anode axis z, as is done in the case of the single and dual circular filaments of the prior art (D in FIG. 4). By keeping the rotation angle small and the centers at the proper depth D into the anode, the electron trajectories starting from either the first or second filament 504, 505 will most closely resemble those of a circular single filament embodiment and will yield a similar mass spectrometer performance. Furthermore, since the length of each filament 504, 505 approaches that of the single circular filament of the prior art, the lifetime of each filament 504, 505 will approach the lifetime of the single circular filament. As a result, the operating time of the mass spectrometer between required maintenance actions can be effectively doubled compared to the single filament ion source of the prior art, and more than doubled compared to the prior art dual filament ion sources.

FIGS. 6A-D show multiple views of an arrangement of the first and second filaments 504, 505 of the ion source assembly 500. In particular, FIGS. 6A-D show a first example of an arrangement of the filaments 504, 505 positioned relative to the anode 503. (In FIGS. 6A-9D, some of the components of the upper portion 502 of the ion source assembly 500 are left out for the sake of clarity.) Referring specifically to FIG. 6C, the exact ellipse is defined by the angle α between the planes Ep1, Ep2 of the filaments and the x-y plane perpendicular to the anode axis z. In this embodiment, the planes Ep1, Ep2 of the two filaments are tipped in opposite directions as shown in FIG. 6C, and each filament 504, 505 is rotated about its center in such a way that one end of each filament is displaced in the +z direction and the other is displaced in the −z direction, with the rotation about an axis L that passes through the center of the filament and intersects both the filaments and the z axis at 90°. As can be seen in FIG. 6A, the radial distance from the filaments 504, 505 to the anode 503 is constant over the central elliptical section 540, 550 of the filaments 504, 505. The elliptical form of the filaments is basically the intersection of a cylinder of radius equal to that of the anode 503 plus the desired filament-to-anode spacing with a plane at angle $$(\frac{\pi}{2} - \alpha)$$

from the cylinder axis.

The filament arrangement shown in FIGS. 6A-7D is rotationally symmetric. In other words, the filaments 504, 505 are the same but are rotated 180° about the z-axis relative to each other. This rotationally symmetric geometry may improve performance over other embodiments in some instances as it provides for a smaller angle of rotation of the filaments from the perpendicular plane x-y, and thus electron emission occurs over a smaller range of depths into the anode. In another embodiment, additional filaments can be included that would be further copies of filaments 504, 505 and each rotated at angles relative to each other and filaments 504, 505. The angles of rotation about z as well as rotation out of the x-y plane may be selected to increase case and efficiency of construction of the ion source assembly 500. FIGS. 7A-D correspond to the embodiments of the filament arrangement shown in FIGS. 6A-D but further include the filament supports 506*a-c*. As shown, there are three (3) filament supports 506*a-c* such that a first filament support 506*a* secures a first end of the first filament 504 and the third filament support 506*c* secures the first end of the second filament 505. The second filament 506*b* secured both seconds ends of the first and second filaments 504, 504. The filament supports 506*a-c* are anchored to the upper plate 509 and may comprise a variety of shapes and configurations to support and retain the first and second filaments 504, 505 relative to the anode 503.

FIGS. 8A-D and 9A-D show another embodiment where the first filament 504 is rotated about an axes of rotation with respect to second filament 505. The first and second filaments 504, 505 of FIGS. 8 and 9 are tipped about their respective centers in such a way that the both ends of the first filament 504 move in the +z direction and both ends of the second filament 505 move in the −z direction by some angle β. In other words the axes of rotation for the filaments L' and L" of the second embodiment are tangential to the filaments 504, 505 at their respective hot spots and lie in the x-y plane.

While both embodiments are shown with the two filaments 504, 505 being tipped by equal and opposite angles α, β, it is not necessary that the angles be equal. However, it is often desired to keep physical symmetry to aid in having consistent performance when switching between filaments. It should also be noted that the distance of the filament emitting area (540, 550) of each filament 504, 505 from the anode 503 is the constant, as is the depth D of each filament emitting area into the anode 103. Moreover, the location of the entire filament emitting area has been changed very little as compared to a single filament embodiment.

The foregoing embodiments of the ion source assembly 500 have many benefits over the prior art. For example, the elliptical shape of the middle portions or emitting lengths 540, 550 of the filaments 504, 505 and the mounting of the filaments 504, 505 to keep the distance of the middle portions 540, 550 of the filament 504 505 to the anode 503 constant causes the electric field between the filament 504, 505 and the anode 503 to be radial (with respect to the anode) and of constant magnitude along the emitting lengths 540, 550 of the filaments 504, 505 (which is similar to that seen when a single, circular filament is used). Moreover, positioning the apex W (FIG. 9A) of both filaments at the same position along the anode axis A (same depth D) means that the majority of ions will be made at similar locations in this direction inside of the ionization volume 510 regardless of which filament 504, 505 the ionizing electrons originate from. Therefore, the ions made will experience similar extraction and focusing fields for injection into the mass filter regardless of which filament 504, 505 is in use.

Finally, the filament length over which significant electron emission takes place of prior art ion source assemblies that comprise two nearly half-circular filaments lying in a common plane is less than that used in the disclosed elliptical configurations when the same filament wire diameter is used with the same (optimal) filament-to-anode distance. Since the thermal conductivity per unit length of the filament depends on the material and the cross-sectional area, these longer filaments will have greater-than-proportionally longer hot emitting sections. Since electron emission per unit area depends strongly and monotonically on temperature, the emission increasing with increasing temperature (Richardson equation), these longer filaments will operate at lower temperatures for a given total emission than their circular, shorter counterparts. As filament lifetimes depend inversely on operating temperature and temperature gradients (both spatial and temporal) these longer filaments have improved lifetimes.

While the present invention has been particularly shown and described with reference to certain exemplary embodiments, it will be understood by one skilled in the art that various changes in detail may be effected therein without departing from the spirit and scope of the invention that can be supported by the written description and drawings. Further, where exemplary embodiments are described with reference to a certain number of elements, it will be understood that the exemplary embodiments can be practiced utilizing either less than or more than the certain number of elements.

What is claimed is:

1. An electron bombardment ion source assembly for use in a mass spectrometer, comprising:

a cylindrical anode extending along an axis and surrounding an ionization volume; and a first filament and a second filament that are each configured to thermionically emit electrons, wherein the first and second filaments are positioned outside the ionization volume and proximate to the cylindrical anode;

wherein the first and second filaments each comprise an elliptically-shaped central length and non-elliptical lengths on either end of the elliptically-shaped central length, wherein the non-elliptical lengths are configured to be mounted in a fixed position relative to the cylindrical anode to maintain a constant distance between the elliptically-shaped central length and the cylindrical anode, and wherein each elliptically-shaped central length extends along a plane that intersects a plane perpendicular to the axis of the cylindrical anode at a non-zero angle.

2. The electron bombardment ion source assembly according to claim 1, wherein each elliptically-shaped central length comprises an apex, wherein the first and second filaments are positioned such that each apex is at a same depth relative to the cylindrical anode.

3. The electron bombardment ion source assembly according to claim 2, wherein each non-zero angle is a result of a rotation of the first and second filaments about an axis of rotation extending through the apex of each of the first and second filaments.

4. The electron bombardment ion source assembly according to claim 1, wherein the rotation of the first filament is rotated about a first axis of rotation and the second filament is rotated about a second axis of rotation, wherein the first and second axes of rotation extend along a common plane that is perpendicular to the axis of the cylindrical anode, and wherein equal and opposite rotations of the first and second filaments result in the first and second filaments extending along parallel planes.

5. The electron bombardment ion source assembly according to claim 3, wherein the axis of rotation intersects the axis of the cylindrical anode at an angle of 90°.

6. The electron bombardment ion source assembly according to claim 5 wherein the second filament is identical to the first filament, and wherein the second filament is rotated 180° about the axis of the cylindrical anode relative to the first filament.

7. The electron bombardment ion source assembly according to claim 1, further comprising a third filament including, an elliptically-shaped central length including an apex, and non-elliptical lengths on either end of the elliptically-shaped central length, wherein the elliptically-shaped central length extends along a plane that intersects the axis of the cylindrical anode at a non-zero angle wherein the third filament is positioned such that the elliptically-shaped central length is a constant distance from the cylindrical anode, and wherein the apex of the third filament is at approximately a same depth as the apex of each of the first and second filaments.

8. The electron bombardment ion source assembly according to claim 7, wherein the non-zero angle results from a rotation of the third filament about an axis of rotation that passes through the apex of the third filament and intersects the axis of the cylindrical anode at 90°.

9. The electron bombardment ion source assembly according to claim 8, wherein the third filament is identical to the first and second filaments and is rotated about the axis of the cylindrical anode relative to the first and second filaments.

10. The electron bombardment ion source assembly according to claim 1, wherein at least one of the first and second filaments is coated with a metal oxide.

11. An electron bombardment ion source assembly for use in a mass spectrometer, comprising:

an anode extending along an axis and surrounding an ionization volume; and at least two filaments that are each configured to thermionically emit electrons, wherein the at least two filaments are positioned outside the ionization volume and proximate to the anode;

wherein the at least two filaments each comprise an elliptically-shaped portion and non-elliptical portions on either end of the elliptically-shaped portion, wherein the non-elliptical portions are configured to be mounted in a fixed position relative to the anode to maintain a constant distance between the elliptically-shaped portion and the anode, and wherein the elliptically-shaped portion extends along a plane that intersects a plane perpendicular to the axis of the anode at a non-zero angle.

12. The electron bombardment ion source assembly according to claim 11, wherein each elliptically-shaped portion comprises an apex, wherein the at least two filaments are each positioned such that each apex is at a same depth relative to the anode.

13. The electron bombardment ion source assembly according to claim 12, wherein each non-zero angle is caused by a rotation of the at least two filaments about an axis of rotation extending through the apex of each of the at least two filaments.

14. The electron bombardment ion source assembly according to claim 11, wherein the at least two filaments extend along parallel planes.

15. The electron bombardment ion source assembly according to claim 13, wherein the axis of rotation intersects the axis of the anode at an angle of 90°.

16. The electron bombardment ion source assembly according to claim 11, wherein the at least two filaments are identical to each other and rotated at an angle about the axis of the anode relative to each other.

17. The electron bombardment ion source assembly according to claim 11, wherein at least one of the at least two filaments is coated with a metal oxide.

* * * * *